Feb. 1, 1966   R. W. GOTHAM   3,232,415
BEARINGLESS ROLLER ACCUMULATION CONVEYOR
Filed Dec. 23, 1963   3 Sheets-Sheet 2
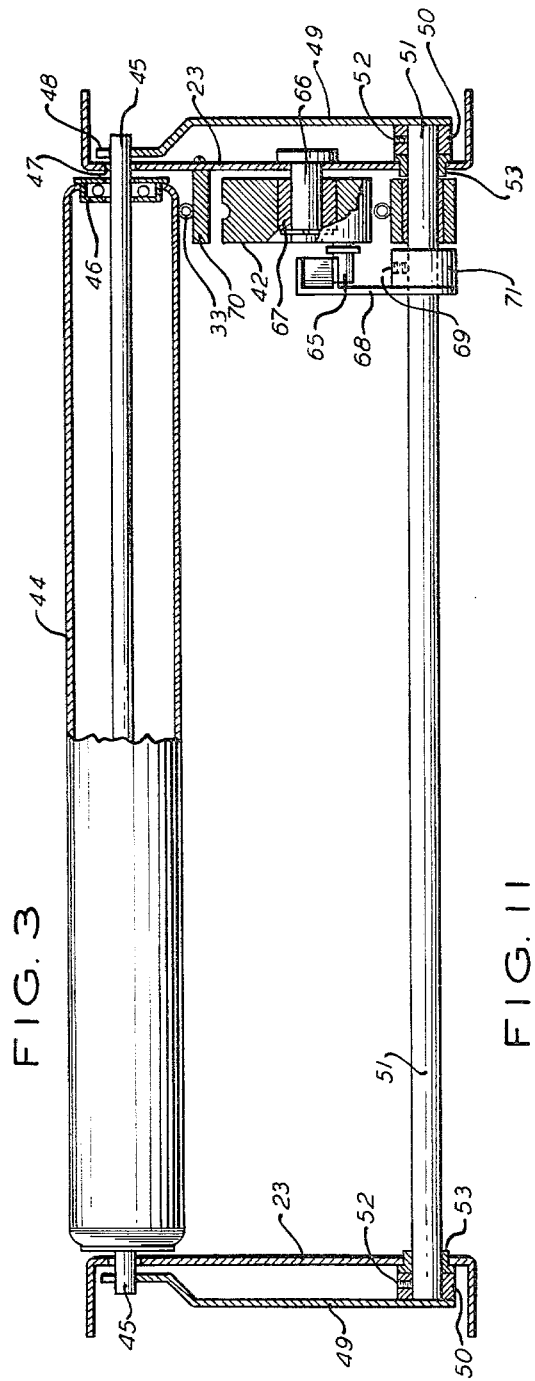
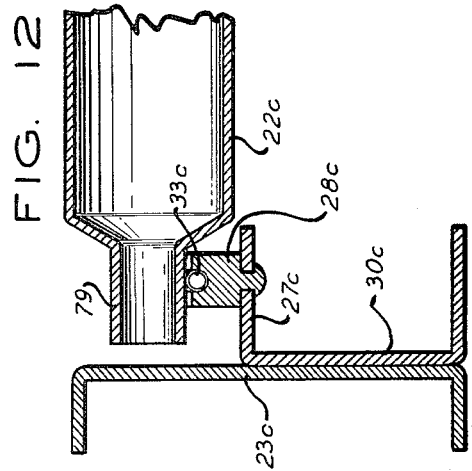
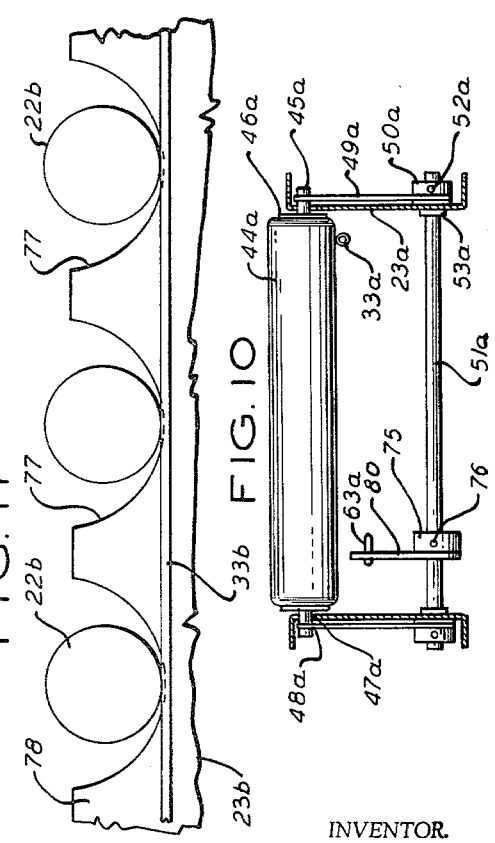
INVENTOR.
ROBERT W. GOTHAM
BY
Towson Price
ATTORNEY INVENTOR.
ROBERT W. GOTHAM
BY Towson Price
ATTORNEY United States Patent Office 3,232,415
Patented Feb. 1, 1966

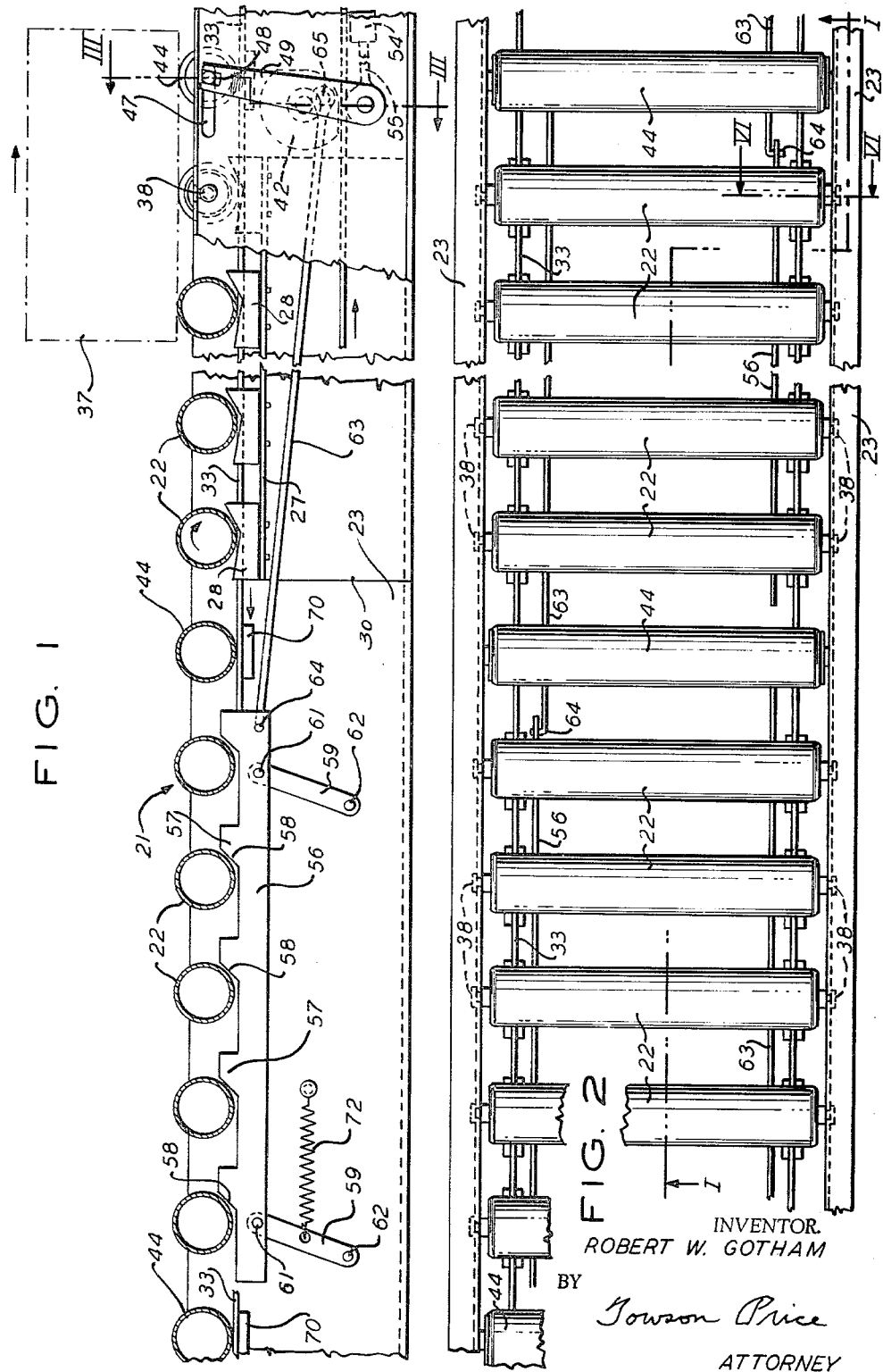

3,232,415
BEARINGLESS ROLLER ACCUMULATION
CONVEYOR
Robert W. Gotham, 98 Mountain Ave., Summit, N.J.
Filed Dec. 23, 1963, Ser. No. 332,759
17 Claims. (Cl. 198—34)

This invention relates to conveyors and, more particularly, to those of the power roller type with means to allow and compensate for accumulation of articles being conveyed while the conveyor is in operation.

Conventional live roller conveyors, and other conveyors using skate wheels instead of rollers, support conveyed articles on rollers or wheels with fixed axles provided with bearings having low friction to minimize the force required to move articles being conveyed. Force may be applied by means such as a belt, chain or cable, which turns the rollers or wheels by friction from either above or below, or directly engages the conveyed articles. When limited pressure to the rollers, wheels or conveyed articles is desired, some means of disengaging or lessening the contact between the driving means and the rollers, wheels or conveyed articles is used.

The reduction of accumulated pressure and energy of impact on articles being conveyed is commonly accomplished by sensing the presence of a conveyed article, usually by means of a raised roller, wheel or feeler which is depressed by the weight of the article. By mechanical, electrical, hydraulic, or pneumatic means, the movement of the conveyor, upstream from the conveyed article, is stopped. This is generally accomplished by lowering the driving means or belt to disengage it from the conveyed article, conveyor wheels or rollers.

There are two principal disadvantages in this method of sensing the presence of a conveyed article by depressing raised devices. First, every article that travels over the device actuates it. This causes the mechanism that controls the belt pressure to operate upstream, although the conveyed article may not be stopped and there may be no reduction desired in the conveyor pressure, thereby causing unnecessary wear on the mechanism. Second, since the sensing device depends upon the weight of the conveyed article for its actuation, different forces are produced by articles of different weights.

In accordance with my invention, the driving force on the conveyed articles is reduced only when one or more of said articles is caused to stop, so that decrease in the driving pressure is desired. Also, this decrease in driving pressure is effected, not in accordance with the weight of the article, but simply by virtue of the stopping of any article. This decrease in pressure may be effected by only the rollers immediately under the stopped article, or this stopping effect may also be conveyed to driving rollers upstream, by sensing rollers, limited in number and interspaced along the line of driving rollers.

An object of my invention is to provide a novel roller conveyor powered by means which is low in cost, efficient in the use of power, and which eliminates many parts found in conventional powered rollers, which parts are costly and subject to wear and replacement.

Another object of my invention is to provide a powered roller conveyor with natural accumulation features which limit the amount of pressure that can be built up, in an accumulated load of conveyed articles, to a percentage of their weight and also, by additional inexpensive means, so that this accumulation of pressure may be further reduced where desired.

A further object of my invention is to provide an accumulation conveyor which is so constructed that it is adapted to be curved horizontally to any degree.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a partial side elevational and partial vertical longitudinal sectional view of one embodiment of my conveyor, on the line I—I of FIGURE 2, in the direction of the arrows.

FIGURE 2 is a plan of the conveyor of FIGURE 1.

FIGURE 3 is a partial elevational and partial transverse sectional view on the line III—III of FIGURE 1, in the direction of the arrows and to a larger scale.

FIGURE 10 is a transverse sectional view corresponding generally to FIGURE 3 but to a smaller scale and showing a modification.

FIGURE 11 is a fragmentary side elevational view corresponding with a part of FIGURE 1, but to a larger scale and showing a modification.

FIGURE 12 is a transverse sectional view corresponding generally to FIGURE 6, but to a smaller scale and showing a modification.

Figure 4:
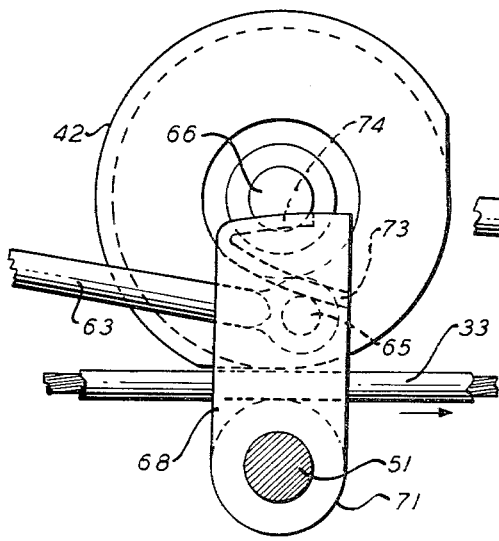
FIGURE 4 is a detailed elevational view, to a larger scale, of the escapement mechanism, shown at the right hand end of FIGURE 1, prior to the operation of a sensing roller to relieve conveyor pressure.

Referring to the drawings in detail, and first considering the embodiment of my invention illustrated in FIGURES 1 to 9, inclusive, there is shown a bearingless roller conveyor generally designated as 21. The bed of the conveyor consists of a series of rollers 22 extending between and supported by channel members or side rails 23 framing the conveyor.

Figure 6:
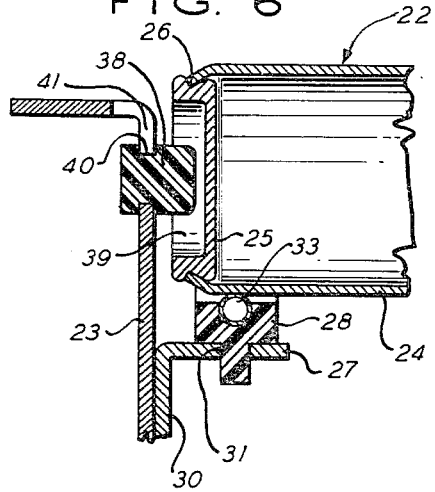
FIGURE 6 is a fragmentary transverse sectional view on the line VI—VI of FIGURE 2, in the direction of the arrows.

Most of the rollers 22 are formed as illustrated in detail in FIGURE 6. That is, each comprises a hollow cylinder or pipe 24 of metal or the like closed at each end by a header or cap 25, either having a peripheral groove 26 into which the outer ends of the cylinder may be turned, or formed as an outwardly opening cup without a groove. In the latter event, each cap 25 may instead be formed with an outstanding flange along its free edge. The adjacent end of the pipe 24 may then abut said flange and be tightly swedged about said cup. These rollers are allowed to move a relatively small distance longitudinally of the rails 23 from which they are supported by means of structural members 30 secured to the rail webs, as by conventional means such as rivets, not shown. These structural members have upper flanges 27 on which are supported guide channels or carrier roller retainers 28, one for each roller at each end thereof.

Figure 7:
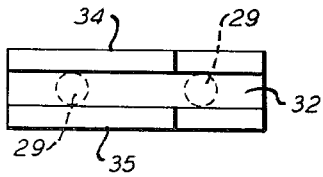
FIGURE 7 is a plan of one of the guide channels and roller support devices, separated from the rest of the mechanism and to the scale of FIGURE 6.
Figure 8:
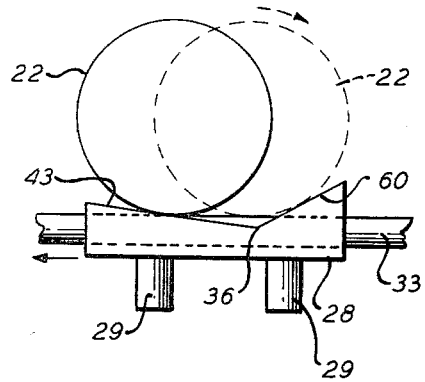
FIGURE 8 is a side elevational view of the guide channel of FIGURE 7, showing the driving cable in position and a supported roller, the latter shown in full lines in a position it may assume when a supported package stops, and in dotted lines in a position it may assume if a supported package overrides.
Figure 9:
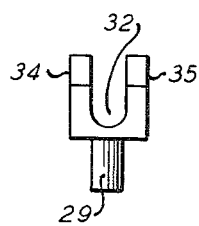
FIGURE 9 is an end elevational view of the guide channel of FIGURES 7 and 8.

These channels 28 are desirably formed of nylon or comparable material and shaped as illustrated in FIGURES 7, 8 and 9, that is, each has a pair of depending studs 29 which are forced into corresponding apertures 31 in the corresponding flanges 27 to hold them in place. The body of each channel 28 is provided with a groove 32 in which slides the driving member or cable 33, desirably formed of nylon-covered steel. Said grooves lie between upstanding longitudinally extending flanges 34 and 35. Each flange, in the embodiment under consideration, is formed as two sections with different end heights, as illustrated, which slope down inwardly from the flange ends toward the lowermost point 36. Each point 36 is here not midway between the ends of each flange, but rather offset from the midpoint, as shown most clearly in FIGURE 8. The purpose of this offset is to provide different inclinations of the tops of the flanges 34 and 35 for a reason which will be subsequently explained.

The inclinations of the tops of the sections of the flanges 34 and 35 are different as shown in said FIGURE 8. That is, the inclination of the section 60 of the flange downstream, or toward the direction of movement of the articles 37 carried by said conveyor, starts from a higher elevation and is greater, an example being 30 degrees, than inclination of the other section 43 which is desirably about 7½ degrees to the horizontal, for example.

This thus stops conveyed article overrun in a shorter distance than the rollers are allowed to turn in removing them from driving engagement by the cable 33. Spaced along the side rails 23 are a series of restraining members 38 which are received in outwardly-opening pockets 39 in the caps 25 of the rollers 22 to limit longitudinal movement of said rollers with respect to said side rails and prevent the rollers from rubbing on said rails. These restraining members may be in the form of solid, generally-cylindrical devices, each of which has a groove 40, so that it may be fitted in place by being pushed down in one of the slots 41 provided along the top portion of each side rail 23. These restraining members 38 may be formed of nylon or other suitable plastic material or equivalent.

In operation, each cable or other drive member 33 may be formed endless, with its top flight riding in the guide channel grooves 32 and on support devices 70 between the more-widely spaced guide channels, underlying the rollers 22 adjacent one end of each, and its bottom flight underlying a control device 42, comprising a truncated wheel or roller of relatively short axial dimension. The ends of each cable 33 may ride around rollers, not shown, at least one of which is power driven. It will, therefore, be seen that in operation, the top flight of each cable 33 may move from right to left, as viewed in FIGURES 1 and 2, thereby turning the rollers clockwise and causing articles, such as 37, disposed on said rollers to move from left to right.

Because the rollers are contained in the guide channels 28, they will initially be pulled back up the relatively moderate inclines 43, or to the full-line position of FIGURE 8. That is, they will be moved slightly upstream or against the normal movement of the conveyed articles. They will then roll back toward the lowermost points 36 of the guide channels 28 and, in so doing, will be engaged by the drive member 33 and eventually assume approximately the same peripheral speed as the linear speed of said member, rolling slightly up, forward and back, between the dotted and full-line positions of said roller 22, as shown in FIGURE 8, if they rotate too fast or too slow, respectively, compared to the movement of the drive member 33.

If a package or other article 37 to be conveyed is placed upon the bed of rollers 22, it will be conducted at the same speed as the drive members 33 but in the opposite direction, that is, from left to right as viewed in FIGURE 1, as would occur in a conventional conveyor. If the package is prevented from moving, as where the conveyor is fully accumulated, and when the package is stopped manually or by mechanical device, the rollers under the package will be pulled slightly up the rear relatively-moderate slope 43, until the drive member 33 slides under the rollers. When the packages are free to move forward, the rollers will roll back down and fully engage the drive members 33 and be powered, as initially, to cause the package to move.

In order to allow for a conveyor where there may be a large accumulation of packages on the rollers 22, with the development of an undesired amount of pressure between packages being conveyed, I provide sensing rollers 44, fewer in number than the carrying rollers 22. In the embodiment illustrated, these rollers 44 are spaced so that five regular carrying rollers 22 are disposed between each pair of sensing rollers 44, as will be seen from a consideration of FIGURES 1 and 2.

Each sensing roller 44 is constructed differently from the carrying rollers 22, in that it has a shaft 45 which extends therethrough and protrudes at opposite ends. Antifriction bearings 46 are desirably provided at each end of each of said sensing rollers with respect to its shaft 45, as shown in FIGURE 3. Each shaft 45 has its ends passing through corresponding elongated slots 47 in the webs of the side rails 23, so that the sensing rollers 44 may have a relatively large longitudinal movement with respect to said side rails. The outer end portions of each shaft 45 are received in upwardly opening notches 48 in the ends of control levers 49, hubs 50 of which are secured to opposite ends of control shafts 51, as by means of set screws 52.

The control shafts 51 are adjustably mounted with respect to the webs of the side rails 23, as by passing through suitable bearing members 53 fitted in said webs. The control levers 49 are biased in a clockwise direction, as shown in FIGURE 1, as by means of counterweights 54 adjustably mounted on the ends of studs 55 projecting laterally from the hubs of said levers, as shown in FIGURE 1. Normally these sensing rollers 44 function in the same fashion as the other rollers 22 until an article is stopped on the conveyor. The sensing conveyor roller over which the article stops then moves rearward or against the direction of the moved articles in the same fashion as the carrying rollers 22 but to a greater degree.

This motion is used to give a mechanical push to a series of carrying rollers upstream, forcing said rollers up inclines and off the moving means 33, or used to trigger a secondary source of force to act on the upstream carrying rollers. In the first action, the force developed is limited by the weight of the article stopped on the sensing roller, the friction between the article bottom and the sensing roller, and the friction between the sensing roller and the moving means. When a light article is on the sensing roller and when the friction components mentioned are low, very little force will be developed, and a relatively heavy article on the controlled series of carrier rollers will not be stopped.

When the conveyor must handle articles of mixed weight with minimum accumulation pressure and impact, the sensing rollers 44 are desirably used to trigger a secondary source of power. This secondary source is, in turn, used to force the controlled carrier rollers 22 rearward and off the moving means 33. Said secondary source of power may be independent of the conveyor and consist of electrical, hydraulic, or pneumatic means. It is, however, desirable for lower cost and reduced maintenance to obtain this power from the moving means of the conveyor.

In accordance with the present embodiment of my invention, I use a carrier roller pusher bar 56 having lugs 57 upstanding from its upper edge and with inclined sides 58 engageable with a series of rollers, in this instance five, disposed between a pair of sensing rollers 44. This pusher bar 56 is pivotally mounted with respect to the top end portions of links 59, as by means of pivot members 61. The lower end portions of said links are connected to the web of the adjacent side rail 23, as by means of pivots 62.

To control this roller pusher 56, the sensing roller 44, beyond the adjacent sensing roller, is used as an escapement means, for the control device or wheel 42, to stop it at a point when the sensing roller is forward, that is, where no accumulation is recognized, and release the wheel 42 and stop it at a point when the sensing roller 44 is in its rear position, as when an article is stopped thereon. This control device 42 is connected to the carrier roller pusher 56 by means of a connecting rod 63, one end of which is pivoted thereto, as at 64, and the other end of which is pivoted to a crank 65 outstanding from the control wheel 42. Said control wheel 42 is freely pivoted with respect to a side rail 23, as on a stud 66 secured thereto and carrying a bushing or bearing 67 on which the control wheel 42 turns.

Figure 5:
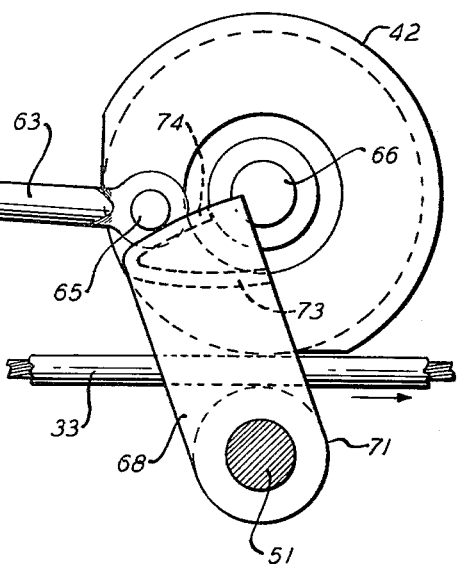
FIGURE 5 is a view corresponding to FIGURE 4, but showing the position of the parts after the sensing roller has operated to raise rollers upstream and relieve the pressure between articles accumulated on the conveyor.

Said control wheel 42 is of the special or truncated shape illustrated in detail in FIGURES 3, 4, and 5, so that, when in the position of FIGURE 5, it is free from the lower flight of the driving cable 33, but when turned to the position of FIGURE 4 it is ready to be engaged by said cable upon movement of the escapement device 68 from the position of FIGURE 4 to that of FIGURE 5.

This escapement device 68 is fixed to the shaft 51, as by means of a set screw 69 through its hub 71 into engagement with said shaft. It is swung by the control lever 49 between the positions of FIGURES 4 and 5. That is, when articles are freely moving on the conveyor and the lever 49 is in the position of FIGURE 1, said escapement device is in the position of FIGURE 4, with the connecting rod 63 pulled farthest to the right as viewed in FIGURE 1, thereby allowing the rollers 22 controlled by said carrier roller pusher 56 to be in their lowermost position in engagement with the drive cable 33.

However, when an article 37 in engagement with a sensing roller 44 is stopped, the roller 44, operated by the top flight of the cable 33, rolls to the left, as viewed in FIGURE 1, and moves its lever 49 counterclockwise, thereby moving the control escapement device 68 from the position of FIGURE 4 to that of FIGURE 5. In so doing, the truncated wheel 42 is released and the biasing spring 72 causes it to move counterclockwise. The outstanding crank 65 is now released from engagement with the lower flange 73 of the escapement device, so that the non-truncated or cylindrical portion of the control wheel 42 is engaged by the lower flight of the drive cable 33 and turned counterclockwise, from the portion of FIGURE 4 to that of FIGURE 5, where it is stopped by engagement with the top flange 74 of said escapement device 68.

This movement causes first a slight lowering of the pusher 56 and then a raising thereof, by virtue of the movement to the left of the connecting rod 63 as viewed in FIGURE 1, thereby raising the controlled rollers 22 out of engagement with the upper flight of the cable 33, whereby they are disconnected from their source of power and stopped, to avoid articles being carried from accumulating against the article 27 which has been stopped for one reason or another.

Referring now to the embodiment of my invention illustrated in FIGURE 10, there is shown a sensing roller 44a as an alternative of the roller 44 of the first embodiment. This roller may be identical with the roller 44 of said preceding embodiment and be one of the series, each pair which is spaced by a number of regular carrying rollers, previously identified by the reference character 22. Each sensing roller 44a, like the rollers 44, is constructed differently from said rollers 22, in that it has a shaft 45a which extends therethrough and protrudes at opposite ends. Antifriction bearings 46a are desirably provided at each end of each of said sensing rollers, with respect to its shaft 45a.

Each shaft 45a has its ends passing through corresponding slots 47a elongated to an extent comparable with elongation of the slots 47, shown in FIGURE 1, formed in the webs of the side rails 23a, so that the sensing rollers 44a may have a relatively large longitudinal movement with respect to said side rails. As in the preceding embodiment, the outer end portions of said shafts 45a are received in upwardly-opening notches 48a, like the notches 48 of the preceding embodiment, formed in the free ends of control levers 49a secured by hus 50a to opposite ends of control shafts 51a, as by means of set screws 52a.

The control shafts 51a are adjustably mounted with respect to the webs of the side rails 23a, as by passing through suitable bearing members 53a fitted in said webs. Each control lever is biased, in a clockwise direction as viewed from the right of FIGURE 10, by suitable means such as a counterweight, comparable with the counterweight 54 of the preceding embodiment and similarly mounted. Normally, these sensing rollers 44a function in the same manner as the rollers 22 until an article is stopped thereabove on the conveyor. The sensing conveyor roller over which the article stops, then moves rearward, or against the direction of the moved articles, in the same fashion as the carrying rollers 22, but to a greater degree.

This motion is used to give a mechanical push to a series of carrying rollers upstream, as in the preceding embodiment, forcing said rollers up in their guides and off the moving means 33. In this instance, however, the structure is simplified in that the control devices 42 are not employed. Instead, each shaft 51a carries an arm 80 having a hub 75 secured thereto, as by means of a set screw 76, so that said arm swings as the shaft 51a turns. The end portion of each arm 80 is connected to a rod 63a corresponding to the rod 63 of the preceding embodiment and with its other end connected to a carrier roller pusher, not here shown, but corresponding with the carrier roller pusher 56 of the preceding embodiment and similarly mounted.

With the construction of the present embodiment, when an article, such as 37, in engagement with a sensing roller 44a is stopped, said roller operated by the top flight of a cable 33a, rolls to the left, as viewed from the right of FIGURE 10, and moves said levers 49a counterclockwise, thereby moving the carrier roller pusher, corresponding with that designated 56 in the preceding embodiment but not here shown, to the left and raising the rollers 22 controlled thereby out of engagement with the upper flight of the cable 33, whereby they are detached from their source of power and stopped, to stop articles being carried from accumulation against the article 37 which has been stopped for one reason or another.

Referring now to the embodiment of my invention illustrated in FIGURE 11, there is shown a conveyor in which the rollers 22b thereof, corresponding generally with the rollers 22 of the first embodiment, are supported at their ends in scallops or curved notches 77 in the upper edge portions 78 of side rails 23b, only fragmentarily illustrated but corresponding with those designated 23 in the first embodiment, instead of on guide channels such as those previously designated 28. These notches 77 function like the notches produced by the inclines on the tops of the flanges 34 and 35 of said guide channels 28, except that by virtue of the inclines being the same each way, they are adapted to be used on a conveyor on which the arcticles conveyed travel either way.

The rollers 22b move back and forth in the notches or scallops 77, when operated by cables or drive members 33b, just like rollers 22 of the first embodiment move back and forth on the inclinations at the tops of the flanges 34 and 35 of the guide channels 28, as described in connection with the preceding embodiment.

Referring now to the embodiment of my invention illustrated in FIGURE 12, there is shown a conveyor in which the rollers 22c thereof are formed with reduced end portions 79, which may be open as illustrated, or closed if desired. These reduced end portions may, when actuated by drive members or cables 33c, roll back and forth on guide channels 28c, corresponding with those designated 28 in the first embodiment. Said channels are supported on the top flanges 27c of structural members 30c, secured to side rails 23c corresponding with the side rails 23 of the first embodiment. Although only one side rail and structural member is here illustrated, it will be understood that these members are provided at the opposite ends of the rollers 22c, only one end of which is here shown.

Having now described my invention in detail in accordance with the requirement of the patent statutes, those skilled in this art will have no difficulty in making changes or modifications in the individual parts or their relative assembly in order to meet specific requirements or conditions. Such changes and modifications may be made without departing from the scope and spirit of the invention, as set forth in the following claims. Where I mention nylon or comparable material for the guide channels, I intend to include other plastics, an example being hard rubber and stamped, cast or machined metals.

I claim:

1. In a conveyor comprising a plurality of rotatable elements to serve as article-carrying means, a powered propelling member disposed below and normally in supporting engagement with said elements to cause them to turn, and means effective upon the stopping of an article being conveyed for raising at least one of said rotatable elements out of engagement with said propelling member to avoid the development of undesired conveying force.

2. In a conveyor as recited in claim 1, wherein the rotatable elements are rollers forming the bed of the conveyor, side rails framing said conveyor, and channel members supported on said side rails, with the rollers extending between and the powered propelling member normally supported on said channel members.

3. In a conveyor as recited in claim 1, wherein the rotatable elements are supported at their ends by side rails, each of said rails having a series of members projecting inwardly therefrom and loosely received in corresponding pockets in the ends of said rotatable elements to restrain movement of said elements with respect to said side rails while allowing for said raising movement.

4. In a conveyor as recited in claim 1, wherein there are side rails framing the conveyor and the rotative elements are supported at their ends in curved notches in the upper edge portions of said side rails, whereby said rollers may move back and forth in the notches and be operated by a drive member in either direction.

5. In a conveyor as recited in claim 1, wherein there is a guide channel supporting each rotatable element at each end, and structural elements, in turn, supporting said guide channel.

6. In a conveyor as recited in claim 5, wherein the rotatable elements have end portions reduced in section, said end portions being what are supported by the guide channels.

7. In a conveyor as recited in claim 5, wherein each of said guide channels has an upwardly opening groove, and the propelling member is slidable in said groove.

8. In a conveyor as recited in claim 7, wherein each guide channel is formed of plastic material and has a pair of depending studs forced into corresponding apertures in the corresponding flange of a structural member, and said propelling member is a cable slidable in a groove at one side of said conveyor.

9. In a conveyor as recited in claim 1, wherein each rotatable element comprises a hollow metal cylinder closed at each end by a cap, and each cap has an outwardly opening pocket to receive restraining means.

10. In a conveyor as recited in claim 9, wherein each cap has a peripheral groove, the adajcent end of said cylinder being turned into said groove.

11. In a conveyor comprising a plurality of rotatable elements to serve as article-conveying means, a powered propelling member normally in supporting engagement with said elements to cause them to turn, and means effective upon the stopping of an article being conveyed for moving a plurality of said elements out of engagement with said propelling member to avoid the development of undesired conveying forces.

12. In a conveyor comprising a series of roller groups to serve as article-carrying means, underlying propelling means to normally cause rotation of said rollers, a carrying roller pusher bar with lugs upstanding from its upper edge and provided with inclined sides engageable with each of said series of said rollers, but resiliently biased so that said rollers are normally free to turn, a sensing roller disposed between and spacing a pair of adjacent series of said article-carrying rollers, a control shaft associated with each sensing roller, a control lever carried at each end of each control shaft and with an end portion operably connected to the adjacent end of said sensing roller, each sensing roller having opposite end portions pivotally mounted with respect to the free end portions of a pair of said control levers, means biasing said control levers so that they normally lie in a position toward the direction of travel of articles on said conveyor, and means operated by the turning of said control shaft, upon pivotal movement of a pair of control levers thereon; when an article being conveyed stops over a sensing roller, to cause said levers to swing in a direction reverse to the flow of articles on said conveyor and move the corresponding pusher bar against its biasing means, to raise the overlying series of rollers, engageable by its lugs, from said propelling means, causing said series to stop rotating.

13. In a conveyor comprising side rails, channel members supported on said side rails, a series of article-carrying roller groups extending between and supported on said channel members to form the bed of said conveyor, underlying propelling means to normally cause rotation of said rollers, a carrying roller pusher bar with lugs upstanding from its upper edge and provided with inclined sides engageable with each of said series of said rollers, but resiliently biased so that said rollers are normally free to turn, a sensing roller disposed between and spacing a pair of adjacent series of said article-carrying rollers, a shaft extending through each sensing roller and with end portions protruding through said side rails, anti-friction bearings provided at each end of each of said sensing rollers with respect to its shaft, slots in said side rails through which the ends of said shafts pass so that each sensing roller may have a relatively large longitudinal movement with respect to said side rails, a control shaft associated with each sensing roller, a control lever with an end portion secured to each end of each control shaft, the end portions of which shaft are carried by said rails, each sensing roller shaft having opposite end portions pivotally carried by the free end portions of a pair of said control levers, means biasing said control levers so that they normally lie in a position toward the direction of travel of articles on said conveyor, and means operated by the turning of a control shaft, upon pivotal movement of a pair of control levers thereon, when an article being conveyed stops over a sensing roller, to cause said levers to swing in a direction reverse to the flow of articles on said conveyor and move the corresponding pusher bar against its biasing means, to raise the overlying series of rollers, engageable by its lugs, from said propelling means, causing said series to stop rotating.

14. In a conveyor as recited in claim 13, wherein there is a control device comprising a wheel freely mounted with respect to a side rail, said propelling means comprises a cable the ends of which ride around rollers, at least one of which is power driven, the top flight of said cable underlying said article-carrying roller groups and the bottom flight underlying said control device, said control wheel being of truncated shape, so that in one position it is free from the lower flight of the propelling cable, but when turned to another position it is ready to be engaged by said cable flight when the sensing roller moves upon the stoppage of an article thereabove, and a connecting rod with one end pivotally connected to said control wheel and the other pivotally connected to said pusher bar, and links with upper ends pivoted to said pusher bar and lower ends pivoted to the adjacent side rails, whereby upon the stopping of an article on said conveyor and the consequent rearward movement of a sensing roller, the control levers are swung by said roller, and allow the control wheel to be engaged by said cable and turned, causing it to rotate, during which movement the pusher bar is pulled against its biasing means and raises the overlying series of rollers from the upper flight of said cable, causing it to stop rotating.

15. In a conveyor as recited in claim 14, an escapement device fixed on each of said control shafts so that it is swung by the corresponding control levers when the associated sensing roller is actuated, a crank outstanding from said control wheel, said escapement device comprising upper and lower flanges angularly positioned with respect to one another, extending into the path of movement of said crank, whereby movement of said escapement device allows movement of said control wheel; the control levers effect a rocking of the escapement device to release the crank, and the said crank release allows the control wheel to be engaged by said cable and turned until stopped by the upper flange of said escapement device.

16. A guide channel for a conveyor comprising a base portion, studs depending from said base portion for holding said channel in place, flanges upstanding from either side of said base portion and defining a groove therebetween for guiding a propelling member, the upper edge of each flange being inclined from its end towards a low point offset from the mid-point, the inclination of top edges of such flanges being greater from one end than from the other.

17. In a conveyor comprising a plurality of approximately parallel rotatable elements to serve as article carrying means, a propelling member at each end and disposed at approximately right angles to and supporting said rotatable elements, a containing member with two inclined surfaces, with the junction line thereof at their lower ends, located beneath each end of the rotatable elements, said junction being below the top surface of the propelling members and part of each inclined surface being above the top surfaces of the propelling members.

References Cited by the Examiner
UNITED STATES PATENTS 2,493,479  1/1950  Eggleston _____ 198—127

SAMUEL F. COLEMAN, *Primary Examiner.*

WILLIAM B. LA BORDE, *Examiner.*